United States Patent [19]

Bricker

[11] 4,308,694
[45] Jan. 5, 1982

[54] WHEELHEAD DRIVE ASSEMBLY FOR A CYLINDRICAL GRINDING MACHINE

[75] Inventor: Robert E. Bricker, Waynesboro, Pa.

[73] Assignee: Litton Industrial Products, Inc., Waynesboro, Pa.

[21] Appl. No.: 168,456

[22] Filed: Jul. 10, 1980

[51] Int. Cl.³ .............................................. B24B 47/04
[52] U.S. Cl. ..................................................... 51/165.8
[58] Field of Search ........................... 51/165.8–165.86

[56] References Cited

U.S. PATENT DOCUMENTS 3,305,978  2/1967  Lumsden ............................ 51/165.8
3,859,760  1/1975  Grieb et al. ......................... 51/165.8

Primary Examiner—Harold D. Whitehead
Attorney, Agent, or Firm—Spencer T. Smith

[57] ABSTRACT

A cylindrical grinding machine comprising a slidable wheelhead assembly, a slide bed having ways supporting the wheelhead assembly, including means to prevent horizontal deviation of the wheelhead along the ways, and precision displacement means to slide the wheelhead assembly along the ways including, rotatable ball screw means axially secured to the slide bed, means to rotate the ball screw comprising a stepping motor, and nut housing means for coupling the nut means to the wheelhead assembly so that rotation of the ball screw slidably displaces the wheelhead assembly along the ways, the nut housing means including a medial flexible portion comprising two horizontal parallel plate portions having selectively configured transverse grooves so that vertical radial strain on the ball screw attributable to the wheelhead assembly is minimized.

2 Claims, 3 Drawing Figures

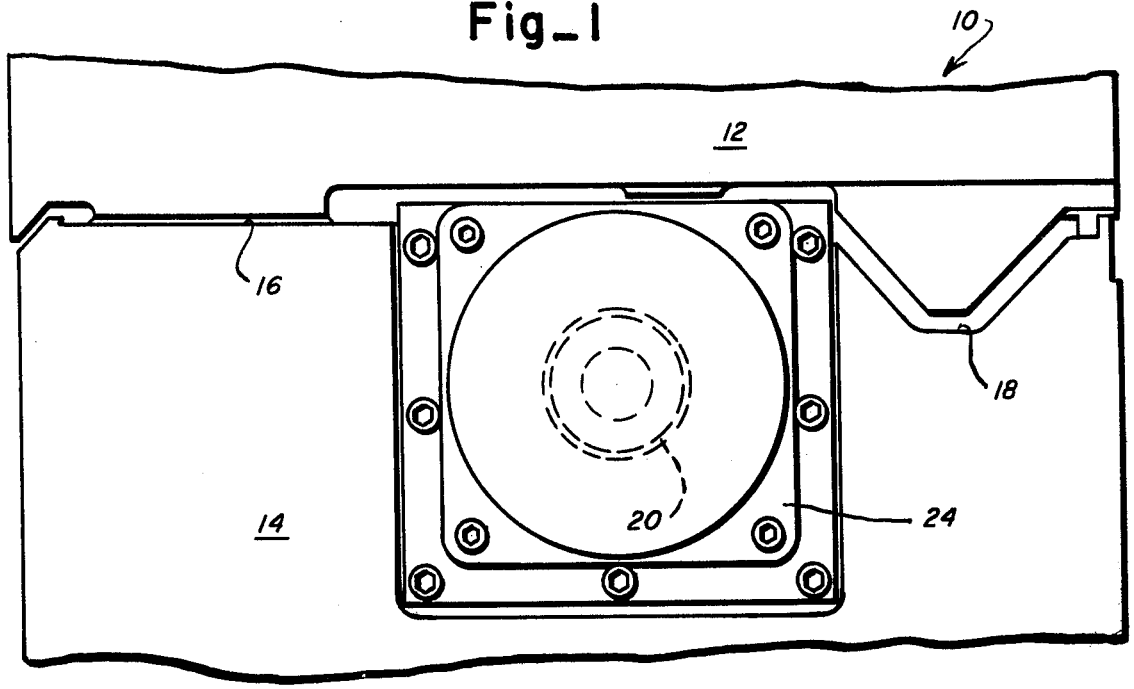
Fig_1
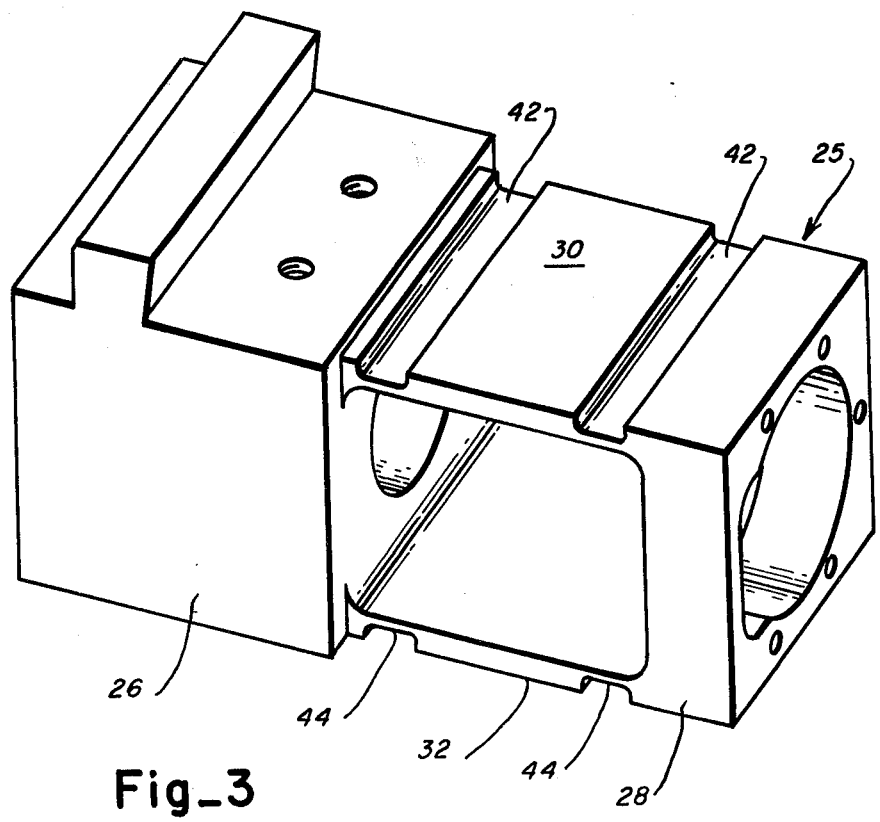
Fig_3

WHEELHEAD DRIVE ASSEMBLY FOR A CYLINDRICAL GRINDING MACHINE

This invention relates to cylindrical grinding machines including a slidable assembly such as a wheelhead which is displaceable through a feed nut assembly.

Conventionally, the wheelhead of a cylindrical grinding machine is rigidly attached to a ball screw nut and an associated ball screw is rotated to effect the desired lateral displacement of the grinding wheel. As the wheelhead traverses the ways of the slide bed, it may be subject to slight changes in its orientation attributable to uneven amounts of oil in the slide ways or wear of the slide ways. The rigid attachment of the ball screw nut to the wheelhead creates radial strain on the ball screw due to such changes in orientation.

It is, therefore, an object of this invention to provide a cylindrical grinding machine having an improved ball screw and nut assembly wherein the radial strain on the ball screw attributable to slight changes of orientation of the wheelhead relative to the bed will be minimized.

Other objects and advantages of the present invention will become apparent from the following portion of this specification and from the accompanying drawings which illustrate, in accordance with the mandate of the patent statutes, a presently preferred embodiment incorporating the principles of the invention.

Referring to the drawings:

FIG. 1 is an elevational view of a portion of a cylindrical grinding machine showing a wheelhead assembly supported on a slide bed;

FIG. 3 is a perspective view of the drive nut housing according to the teachings of the present invention.

Figure 2:
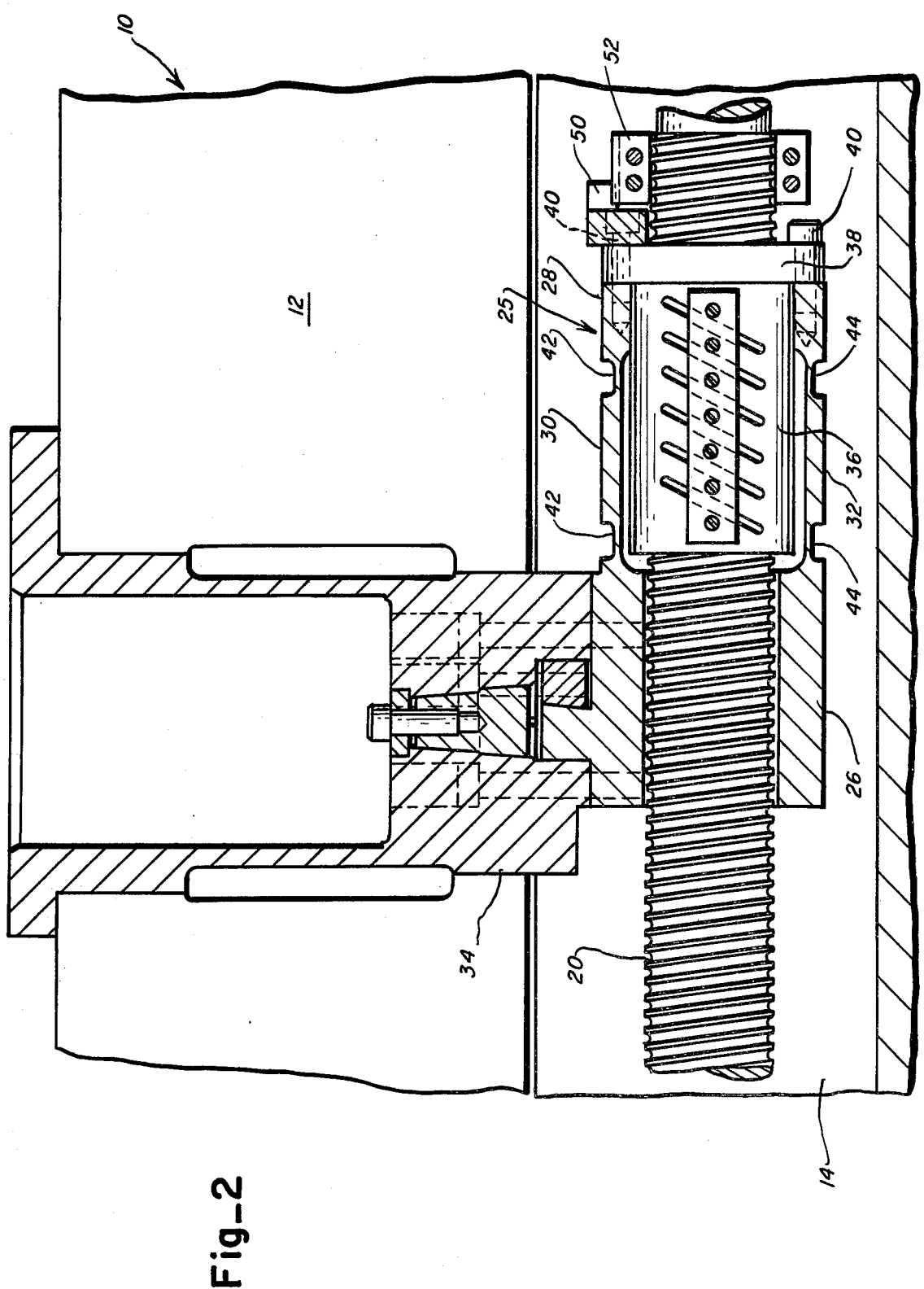
FIG. 2 is a sectional view of the wheelhead drive mechanism.

The cylindrical grinding machine includes a wheelhead assembly 10 having a housing 12 which supports a rotatable grinding wheel (not shown). The wheelhead assembly 10 is supported on a slide bed 14 for lateral displacement along two slide ways 16 and 18. One of the ways 18 is V-shaped to maintain true lateral tracking of the wheelhead assembly 10 along the ways 16 and 18 without horizontal deviation.

A ball screw 20 and an associated drive nut assembly are utilized to displace the wheelhead 10 along the slide ways. The ball screw 20 is supported for rotational displacement on the slide bed 14. A stepping motor 24 is used to rotate the ball screw 20 to achieve precision displacement of the wheelhead assembly 10. The nut assembly includes a housing 25 through which the ball screw passes having first and second end block portions 26 and 28 connected by two horizontal parallel plate portions 30 and 32. The first end portion 26 is rigidly attached to the wheelhead by a conventional clamp assembly 34 and is selectively sized to avoid contact with the ball screw 20. The second end portion 28 matingly receives a ball nut 36 having a flanged end 38 which is secured to the housing by bolts 40.

The plates 30 and 32 each contain selectively defined transverse grooves 42 and 44 which allow the housing 25 to flex to absorb slight changes of vertical orientation of the wheelhead 10 relative to the bed 14 but does not significantly effect the precision of the wheelhead movement. Therefore, the vertical axial strain on the ball screw 20 is reduced without significant loss of wheelhead precision.

In the preferred embodiment, the ball nut 36 extends within the housing 25 substantially to the first end portion 26 and the flange 38 of the ball nut 36 has bolt holes larger than the stems of the bolts 40 which secure it to the second end portion 28 of the nut housing 25 so that once assembled, the bolts 40 may be loosened to relieve any initial axial stress and then tightened for operational usage. Also, the drive nut assembly includes a protruding safety stop 50 which engages a rotating stop 52 on the ball screw 20 to stop the screw rotation, and thereby the lateral wheelhead movement, when engaged.

What is claimed is:

1. A cylindrical grinding machine comprising:
   a slidable wheelhead assembly,
   a slide bed having ways supporting said wheelhead assembly, including means to prevent horizontal deviation of said wheelhead along said ways, and
   precision displacement means to slide said wheelhead assembly along said ways including,
   rotatable ball screw means axially secured to said slide bed,
   means to rotate said ball screw comprising a stepping motor,
   ball screw nut means engaging said ball screw means, and
   nut housing means for coupling said nut means to said wheelhead assembly so that rotation of said ball screw slidably displaces said wheelhead assembly along said ways,
   said nut housing means including a medial flexible portion comprising two horizontal parallel plate portions having selectively configured transverse grooves so that vertical radial strain on said ball screw attributable to said wheelhead assembly is minimized.

2. A grinding machine comprising
   a wheelhead assembly,
   a bed for supporting said wheelhead assembly for sliding displacement relative thereto, and
   means for effecting relative sliding displacement between said bed and said wheelhead assembly including,
   a ball screw supported for rotational displacement on said bed,
   stepping motor means for rotationally displacing said ball screw,
   drive nut means secured to said wheelhead assembly including
      a ball nut having a flanged end for engaging with said ball screw, and
      a housing having first and second axially spaced end block portions connected by upper and lower parallel plate portions each including transverse channel means therein for permitting slight vertical changes in orientation of said first end portion relative to said second end portion,
      said first portion having an axially extending bore selectively sized to permit passage of said ball screw therethrough without contact, and
      said second portion having an axial bore therein for matingly receiving said ball nut and the length of said nut being selected so that when fully inserted into said second housing portion bore said nut will extend substantially to said first housing portion and be spaced therefrom.

* * * * *